United States Patent [19]

Funabashi

[11] Patent Number: 5,354,820

[45] Date of Patent: Oct. 11, 1994

[54] PROCESS FOR THE PREPARATION OF OLEFIN POLYMER

[75] Inventor: Hideo Funabashi, Ichihara, Japan

[73] Assignee: Idemitsu Petrochemical Company Limited, Tokyo, Japan

[21] Appl. No.: 999,654

[22] Filed: Dec. 29, 1992

Related U.S. Application Data

[63] Continuation of Ser. No. 759,974, Sep. 17, 1991, abandoned, which is a continuation of Ser. No. 279,174, Dec. 2, 1988, abandoned.

[30] Foreign Application Priority Data

Dec. 7, 1987 [JP] Japan .................. 62-309208
Dec. 7, 1987 [JP] Japan .................. 62-309209

[51] Int. Cl.$^5$ .................. C08F 4/649; C08F 10/06
[52] U.S. Cl. .................. 526/124; 526/125; 526/348; 526/351; 526/352
[58] Field of Search ............... 526/124, 125, 351, 352, 526/348

[56] References Cited

U.S. PATENT DOCUMENTS

| | | | |
|---|---|---|---|
| 4,143,223 | 3/1979 | Toyota et al. | 526/124 |
| 4,255,544 | 3/1981 | Kimura et al. | 526/124 |
| 4,301,029 | 11/1981 | Caunt et al. | 526/128 |
| 4,342,855 | 8/1982 | Akimoto et al. | 526/124 |
| 4,442,276 | 4/1984 | Kashiwa et al. | 526/128 |
| 4,458,027 | 7/1984 | Berge et al. | 526/128 |
| 4,544,648 | 10/1985 | Nomura et al. | 526/128 |
| 4,565,798 | 1/1986 | Yamamoto et al. | 526/124 |
| 4,654,318 | 3/1987 | Yamamoto et al. | 526/124 |
| 4,716,206 | 12/1987 | Fujita et al. | 526/124 |
| 4,948,841 | 8/1990 | Kasahara et al. | 525/240 |
| 5,093,443 | 3/1992 | Nowlin et al. | 526/129 |

FOREIGN PATENT DOCUMENTS

| | | |
|---|---|---|
| 0045975 | 2/1982 | European Pat. Off. |
| 0147053 | 7/1985 | European Pat. Off. |
| 0156512 | 10/1985 | European Pat. Off. |
| 0166970 | 1/1986 | European Pat. Off. |
| 59-11306 | 1/1984 | Japan .................. 526/124 |
| 60-25441 | 6/1985 | Japan . |

*Primary Examiner*—Romulo H. Delmendo
*Attorney, Agent, or Firm*—Armstrong, Westerman, Hattori, McLeland & Naughton

[57] ABSTRACT

This invention relates to a process of producing an olefin polymer having stereoregularity by polymerizing an olefin in the presence of a catalyst obtained from (A) a solid catalyst component obtained by reacting a dialkoxymagnesium represented by the general formula: $Mg(OR^1)_m X^1_{2-m}$, wherein $R^1$ represents a cycloalkyl group, an aryl group, or an alkyl group having 1 to 10 carbon atoms, $X^1$ represents an halogen atom, and m is 1 to 2, an organic acid ester, a silicon compound represented by the general formula: $Si(OR^2)_n X^2_{4-n}$, wherein $R^2$ represents an alkyl group, a cycloalkyl group, or an aryl group, $X^2$ represents a halogen atom such as chlorine and bromine, and n is a real number of 0 to 3.0, and an a titanium compound, (B) an organic aluminum compound, and (C) an electron donative compound, characterized in that, as a first step, said dialkoxymagnesium, an aromatic dicarboxylic acid ester, and said silicon compound are reacted, and then, as a second step, a solid product obtained by reacting the reaction product obtained in said first step with a titanium tetrahalide is used as said solid catalyst component (A).

8 Claims, No Drawings

PROCESS FOR THE PREPARATION OF OLEFIN POLYMER

This application is a continuation of application Ser. No. 759,974 filed Sep. 17, 1991, now abandoned which is a continuation of application Ser. No. 279,174 filed Dec. 2, 1988, now abandoned.

BACKGROUND OF THE INVENTION

(1) Field of the Invention

The present invention relates to a process for the preparation of an olefin polymer, more particularly to a process for the preparation of an olefin polymer wherein the polymerization activity of the catalyst is high, and lowers less with time, and the stereoregularity of the obtained olefin polymer is high.

(2) Description of the Related Art

Hitherto, a process for the preparation of an olefin polymer was known which used a Ziegler-Natta catalyst comprising a combination of a carrier obtained by partially halogenating a dialkoxymagnesium and a solid catalyst component carrying a titanium component (Japanese Patent Publication No. 25441/1985).

However, regarding the above-mentioned catalyst, although the polymerization activity per unit time is high initially, the polymerization activity per unit time lowers greatly with the lapse of time of the polymerization. Therefore, in the case wherein it is required to prolong the time of the polymerization as in the case of a block copolymerization reaction, it is not advantageous to use the above-mentioned catalyst in view of the production of an olefin polymer.

The object of the present invention is to provide a process for the preparation of an olefin polymer wherein the above defect of the prior art is overcome, the polymerization activity lowers less with time, the stereoregularity of the obtained olefin polymer is high, and the catalyst residue remained in said olefin polymer is less.

SUMMARY OF THE INVENTION

The inventors have conducted researches intensively to attain the above object, and have found that the above excellent effect can be obtained by polymerizing an olefin in the presence of a catalyst obtained from a specific solid catalyst component, an organic aluminum compound, and an electron donative compound, leading to the completion of the present invention.

The present invention provides:

a process of producing an olefin polymer having stereoregularity by polymerizing an olefin in the presence of a catalyst obtained from (A) a solid catalyst component obtained by reacting a dialkoxymagnesium represented by the general formula: $Mg(OR^1)_m X^1_{2-m}$, wherein $R^1$ represents a cycloalkyl group, an aryl group, or an alkyl group having 1 to 10 carbon atoms, $X^1$ represents an halogen atom, and m is 1 to 2, an organic acid ester, a silicon compound represented by the general formula: $Si(OR^2)_n X^2_{4-n}$, wherein $R^2$ represents an alkyl group, a cycloalkyl group, or an aryl group, $X^2$ represents a halogen atom such as chlorine and bromine, and n is a real number of 0 to 3.0, and an a titanium compound, (B) an organic aluminum compound, and (C) an electron donative compound, characterized in that, as a first step, said dialkoxymagnesium, an aromatic dicarboxylic acid ester, and said silicon compound are reacted, and then, as a second step, a solid product obtained by reacting the reaction product obtained in said first step with a titanium tetrahalide is used as said solid catalyst component (A); and a process of producing an olefin polymer having stereoregularity by polymerizing an olefin in the presence of a catalyst obtained from (A) a solid catalyst component obtained by reacting a dialkoxymagnesium represented by the general formula: $Mg(OR^1)_m X^1_{2-m}$, wherein $R^1$ represents a cycloalkyl group, an aryl group, or an alkyl group having 1 to 10 carbon atoms, $X^1$ represents an halogen atom, and m is 1 to 2, an organic acid ester, a silicon compound represented by the general formula: $Si(OR^2)_n X^2_{4-n}$, wherein $R^2$ represents an alkyl group a cycloalkyl group, or an aryl group, $X^2$ represents a halogen atom such as chlorine and bromine, and n is a real number of 0 to 3.0, and an a titanium compound, (B) an organic aluminum compound, and (C) an electron donative compound, characterized in that, as a first step, said dialkoxymagnesium, an aromatic dicarboxylic acid ester, said silicon compound, and an alcohol represented by the general formula: $R^4$—OH wherein $R^4$ represents a cycloalkyl group or a linear or branched alkyl group having 1 to 10 carbon atoms, are reacted, and then, as a second step, a solid product obtained by reacting the reaction product obtained in said first step with a titanium tetrahalide is used as said solid catalyst component (A).

DESCRIPTION OF THE PREFERRED EMBODIMENTS

Concerning Catalysts

The catalysts used in the present invention are a catalyst obtained from a solid catalyst component (A) obtained by reacting, as a first step, said dialkoxymagnesium, an aromatic dicarboxylic acid ester, and said silicon compound, and then, reacting, as a second step, the reaction product obtained in said first step with a titanium tetrahalide, an organic aluminum compound (B), and an electron donative compound (C); and a catalyst obtained from said solid catalyst component (A) obtained by reacting, as a first step, said dialkoxymagnesium, an aromatic dicarboxylic acid ester, said silicon compound, and an alcohol represented by the general formula: $R^4$—OH, wherein $R^4$ represents a cycloalkyl group or a linear or branched alkyl group having 1 to 10 carbon atoms, and then, reacting, as a second step, the reaction product obtained in said first step with a titanium tetrahalide, an organic aluminum compound (B) and an electron donative compound (C).

Concerning the Solid Catalyst Component (A)

(a) The Dialkoxymagnesium

The dialkoxymagnesium used in the preparation of the solid catalyst (A) is represented by the general formula: $M(OR^1)_m X^1_{2-m}$ wherein $R^1$ represents a cycloalkyl group, an aryl group or an alkyl group having 1 to 10 carbon atoms, $X^1$ represents a halogen atom, and m is 1 to 2.

Examples of the dialkoxymagnesium mentioned above include dimethoxymagnesium, diethoxymagnesium, dipropoxymagnesium, di-sec-butoxymagnesium, di-tert-butoxymagnesium, diisopropoxymagnesium, dipentoxymagnesium, dihexoxymagensium, dioctoxymagnesium, dicyclohexoxymagnesium, and diphenoxymagnesium.

In the present invention, the dialkoxymagnesiums mentioned above may be used alone or as a mixture of two or more of them.

Among them the dialkoxymagnesiums containing alkoxy group having 1 to 4 carbon atoms are preferable, with diethoxymagnesium and dipropoxymagnesium particularly preferred.

(b) The Aromatic Dicarboxylic Acid Ester

As monoesters of an aromatic dicarboxylic acid, and diesters of an aromatic dicarboxylic acid, monoesters and diesters of phthalic acid are preferable, which include monomethyl phthalate, dimethyl phthalate, monomethyl terephthalate, dimethyl terephthalate, monoethyl phthalate, diethyl phthalate, monoethyl terephthalate, diethyl terephthalate, monopropyl phthalate, dipropyl phthalate, monopropyl terephthalate, dipropyl terephthalate, monobutyl phthalate, dibutyl phthalate, monobutyl terephthalate, dibutyl terephthalate, monoisobutyl phthalate, diisobutyl phthalate, monoamyl phthalate, diamyl phthalate, monoisoamyl phthalate, diiosamyl phthalate, ethylbutyl phthalate, ethylisobutyl phthalate, and ethylpropyl phthalate.

In the present invention, the monoesters and diesters of the aromatic dicarboxylic acids mentioned above may be used alone or as a mixture of two or more of them.

When the monoesters of the aromatic dicarboxylic acids are compared with the diesters of the aromatic dicarboxylic acids, the diesters of the aromatic dicarboxylic acids are preferable.

Of the diesters of the aromatic dicarboxylic acids, lower alkyl esters of phthalic acid wherein the lower alkyl group has 1 to 5 carbon atoms are preferable, with diethyl phthalate, dibutyl phthalate, and diisobutyl phthalate particularly preferable.

(c) The Silicon Compound

The silicon compound mentioned above is represented by the general formula: $Si(OR^2)_nX^2_{4-n}$ wherein $R^2$ represents an alkyl group, a cycloalkyl group, or an aryl group, represents a $X^2$ represents a halogen atom such as chlorine and bromine, and n is a real number of 0 to 3.0.

Specifically, the silicon compound mentioned above includes $SiCl_4$, $CH_3OSiCl_3$, $(CH_3O)_2SiCl_2$, $(CH_3O)_3SiCl$, $C_2H_5OSiCl_3$, $(C_2H_5O)_2SiCl_2$, $(C_2H_5O)_3SiCl$, $C_3H_7OSiCl_3$, $(C_3H_7O)_2SiCl_2$, and $(C_3H_7O)_3SiCl$, which may be used alone or in combination.

Of these silicon compounds, silicon tetrachloride ($SiCl_4$) is preferable.

(d) The Alcohol

The alcohol mentioned above is represented by the general formula $R^4$—OH wherein $R^4$ represents a cycloalkyl group or a linear or branched alkyl group having 1 to 10 carbon atoms.

Specific examples of the alcohol include methanol, ethanol, propanol, isopropanol, butanol, isobutanol, amyl alcohol, octanol, and cyclohexanol.

Of these alcohols, preferable one is isopropanol.

(e) Titanium Tetrahalide

Specific examples of the titanium tetrahalide mentioned above include $TiCl_4$, $TiBr_4$, and $TiI_4$.

Of these titanium tetrahalides, titanium tetrachloride ($TiCl_4$) is preferable.

(f) Preparation of the Solid Catalyst Component (A)

The preparation of the above-mentioned solid catalyst component (A) is carried out in two steps described below.

That is, as the first step, the dialkoxymagnesium, and the monoester of the aromatic dicarboxylic acid and/or the diester of the aromatic dicarboxylic acid are catalytically reacted in an inactive solvent at a prescribed temperature for a prescribed period with stirring.

In the case where the above-mentioned alcohol is used, as the first step, the dialkoxymagnesium, the monoester of the aromatic dicarboxylic acid and/or the diester of the aromatic dicarboxylic acid, the silicon compound, and the alcohol are catalytically reacted in an inactive solvent at a prescribed temperature for a prescribed period with stirring.

In this case, the molar amount of the monoester of the aromatic dicarboxylic acid and/or the diester of the aromatic dicarboxylic acid to be used is generally 0.01 to 1 times, preferably 0.05 to 0.5 times, as much as that of the dialkoxymagnesium.

The molar amount of the silicon compound is used generally 0.01 times or more, preferably 0.05 to 5 times, as much as that of dialkoxymagnesium.

When the molar amount of the silicon compound to be used is less than 0.01 times or excessive, the improvement in the polymerization activity of the catalyst is not enough, and the stereoregularity of the obtained olefin polymer becomes insufficient.

The molar amount of the alcohol to be used is 0.01 times or over, preferably 0.05 to 2 times or over, as much as that of the dialkoxymagnesium.

When the molar amount of the alcohol to be used is less than 0.01 times or excessive, the improvement in the polymerization activity of the catalyst is not enough, and the stereoregularity of the obtained polymer becomes insufficient.

There is no limitation of the order of the addition of the above-mentioned components, and the components may be added one after another or simultaneously.

As the solvent mentioned above, any solvent may be used if the solvent is inactive toward each component, and examples of such a solvent include aliphatic hydrocarbons and cycloaliphatic hydrocarbons, and more specifically, pentane, hexane, n-heptane, and cyclohexane.

The reaction using such a solvent is a preferable mode of the present invention, although the reaction can be carried out in the absence of such a solvent. In the latter case, the components mentioned above are reacted by mixing them directly and mechanically by a ball mill or the like.

The temperature of the reaction is generally $-10°$ to $150°$ C., and preferably it is effective that the reaction temperature is $20°$ to $120°$ C., which increases the polymerization activity of the catalyst that will be obtained.

Since the reaction time depends on the reaction temperature, the reaction time will be suitably selected depending on reaction temperature.

In the second step, the solid substance obtained in the first step, optionally after washing, is reacted with a titanium tetrahalide.

The second step of the process of the present invention is carried out in the order as mentioned above, and generally the operation is carried in a liquid phase containing the titanium tetrahalide or in an inactive solvent such as pentane, hexane, n-heptane, and cyclohexane containing the titanium tetrahalide at a reaction temperature of $20°$ to $200°$ C., preferably $50°$ to $150°$ C., for a reaction time of 5 min to 10 hours, preferably 30 min to 5 hours.

The amount of the titanium tetrahalide to be used is 1 to 100 mols, preferably 10 to 100 mols, per gram atom of magnesium used in the first step.

In the present invention, the solid product obtained by the reaction in the second step is, if necessary, washed with an inactive hydrocarbon such as heptane, hexane, cyclohexane, and n-heptane, and is used as the solid catalyst component (A) of the catalyst for polymerizing an olefin.

(g) The Amount of the Solid Catalyst Component (A) to be Used

The amount of the solid catalyst component (A) to be used, in the case of a liquid phase polymerization, is 0.001 to 10 mmol/l, preferably 0.005 to 5 mmol/l with the component (A) calculated as titanium atoms.

Concerning the Organic Aluminum Compound (B)

As the organic aluminum compound mentioned above, is suitably used a trialkylaluminum such as trimethylaluminum, triethylaluminum, triisopropylaluminum, triisobutylaluminum, or trioctylaluminum, or a dialkylaluminum monohalide such as diethylaluminum monochloride, diisopropylaluminum monochloride, diisobutylaluminum monochloride, or dioctylaluminum monochloride and a mixture of these also may be used.

In the present invention, the organic aluminum compounds mentioned above may be used alone or as a mixture of two or more of them.

Of the organic aluminum compounds, a trialkylaluminum having a lower alkyl group with 1 to 5 carbon atoms is preferable, and, for example, trimethylaluminum, triethylaluminum, tripropylaluminum, and tributylaluminum are particularly preferable.

The amount of the organic aluminum compound to be used is generally from 1 to 1,000 (molar ratio), preferably from 10 to 500 (molar ratio) with the organic aluminum compound calculated as titanium atoms present in the solid catalyst component (A).

Concerning the Electron Donative Compound (C)

The electron donative compound mentioned above includes organic compounds containing oxygen, nitrogen, phosphorus or sulfur, and specific examples thereof are amines, amides, ketones, nitriles, phosphines, phosphoramides, esters, ethers, thioethers, thioesters, acid anhydrides, acid halides, acid amides, aldehydes, organic acids, and organic silane compounds having an Si—O—C bond.

More specific examples are organic acids such as aromatic carboxylic acids for example benzoic acid, and p-oxybenzoic acid; acid anhydrides such as succinic anhydride, benzoic anhydride, and p-toluic anhydride; ketones having 3 to 15 carbon atoms such as acetone, methyl ethyl ketone, methyl isobutyl ketone, acetophenone, benzophenone, and benzoquinone; aldehydes having 2 to 15 carbon atoms such as acetaldehyde, propionaldehyde, octyl aldehyde, benzaldehyde, tolualdehyde, and naphthaldehyde; esters having 2 to 18 carbon atoms such as methyl formate, methyl acetate, ethyl acetate, vinyl acetate, propyl acetate, octyl acetate, cyclohexyl acetate, ethyl propionate, ethyl butyrate, ethyl valerate, methyl chloroacetate, ethyl dichloroacetate, methyl methacrylate, ethyl crotonate, ethyl pivalate, dimethyl maleate, ethyl cyclohexanecarbonate, methyl benzoate, ethyl benzoate, propyl benzoate, butyl benzoate, octyl benzoate, cyclohexyl benzoate, phenyl benzoate, benzyl benzoate, methyl toluate, ethyl toluate, amyl toluate, ethyl ethylbenzoate, methyl anisate, ethyl anisate, ethyl ethoxybenzoate, ethyl p-butoxybenzoate, ethyl o-chlorobenzoate, ethyl naphthoate, γ-butyrolactone, δ-valerolactone, cumarin, phthalide, ethylene carbonate, di-n-butyl phthalate, di-isobutyl phthalate, diheptyl phthalate, and dicyclohexyl phthalate; acid halides having 2 to 15 carbon atoms such as acetyl chloride, benzyl chloride, toluyl chloride, and anisyl chloride; ethers having 2 to 20 carbon atoms such as methyl ether, ethyl ether, isopropyl ether, t-butyl methyl ether, t-butyl ethyl ether, n-butyl ether, amyl ether, tetrahydrofuran, anisole, diphenyl ether, and ethylene glycol butyl ether; acid amides such as acetic amide, benzamide, and toluamide; amines such as tributylamine, N,N-dimethylpiperazine, tribenzylamine, aniline, pyridine, picoline, and tetramethylethylenediamine; nitriles such as acetonitrile, benzonitrile, and trinitrile; tetramethyl urea, nitrobenzene, and lithium butyrate.

Examples of the organic silicon compound having an Si—O—C bond are alkoxysilanes, and aryloxysilanes.

An example of such an organic silicon compound is a silicate represented by the general formula:

$$R^5{}_w Si(OR^6)_{4-w}$$

wherein $R^5$ represents an alkyl group, a cycloalkyl group, a phenyl group, an aryl group, an alkenyl group, a haloalkyl group, an aminoalkyl group, or a halogen atom, $R^6$ represents an alkyl group, a cycloalkyl group, an aryl group, an alkenyl group, or an alkoxyalkyl group, w is such that $0 \leq w \leq 3$, $R^5$'s may be the same or different, and $OR^6$'s may be the same or different.

Other examples include silyl esters of carboxylic acids, or siloxanes having an $OR^6$ group. As other examples can be mentioned ones obtained by previously reacting a silicon compound having no Si—O—C bond with an organic compound having an O—C bond, or by reacting it at the time of the polymerization of an α-olefin to be converted to an organic silicon compound having an Si—O—C bond, and for example a combination of SiCl$_4$ and an alcohol can be used.

Specific compounds of the organic silicon compound having an Si—O—C bond are trimethylmethoxysilane, trimethylethoxysilate, dimethyldimethoxysilane, dimethyldiethoxysilane, diphenyldimethoxysilane, methylphenyldimethoxysilane, diphenyldiethoxysilane, phenyltrimethoxysilane, γ-chloropropyltrimethoxysilane, methyltriethoxysilane, ethyltriethoxysilane, vinyltriethoxysilane, butyltriethoxysilane, phenyltriethoxysilane, γ-aminopropyltriethoxysilane, chlorotriethoxysilane, ethyltriisopropoxysilane, vinyltributoxysilane, ethyl silicate, butyl silicate, trimethylphenoxysilane, methyltriallyloxysilane, vinyltris(β-methoxyethoxy)silane, vinyltriacetoxysilane, and dimethyltetraethoxydisiloxane.

Of the electron donative compounds (C), examples of preferable ones are esters, ethers, ketones, acid anhydrides and organic silane compounds having an Si—O—C bond.

Particularly, it is preferable to use a combination of a phthalate such as di-n-butyl phthalate, di-iso-butyl phthalate, diheptyl phthalate, and dicyclohexyl phthalate with an ether such as t-butyl methyl ether, or t-butyl ethyl ether, or to use an alkyl ester of an aromatic carboxylic acid, such as alkyl ester having 1 to 4 carbon atoms of benzoic acid, p-methoxybenzoic acid, p-ethoxybenzoic acid, and toluic acid, or a trialkoxysilane, or to use an aromatic ketone such as benzoquinone, an aromatic carboxylic acid anhydride such as benzoic anhydride, or an ether such as ethylene glycol butyl ether.

The amount of the electron donative compound (C) to be used is 1 to 500 (molar ratio), preferably 5 to 200 (molar ratio), for the titanium atom in the solid catalyst component (A).

Concerning Olefins

Although there is no limitation on the olefins that can be used in the process of the present invention, generally one represented by the general formula:

$$R^3-CH=CH_2$$

wherein $R^3$ represents hydrogen or an alkyl group having 1 to 6 carbon atoms, for example, a linear monoolefin such as ethylene, propylene, butene-1, hexene-1, and octene-1, a branched monoolefin such as 4-methylpentene-1 will be used.

These may be used alone or as a mixture of two or more of them.

Of these, particularly ethylene, propylene and butene-1 are preferable.

In the process of the present invention, dienes such as butadiene or the like may also be used.

Preparation of an Olefin Polymer

In the present invention, in polymerizing an olefin, a dispersion of a solid catalyst component that is the component (A), an organic aluminum compound that is the component (B), and an electron donative compound that is the component (C) are used as catalyst in the reaction system, and the olefin is introduced into the system.

There is no limitation on the way of the polymerization, the conditions of the polymerization, etc., and any of slurry polymerization using an inactive hydrocarbon solvent, liquid phase polymerization without any solvent, gaseous polymerization, etc. may be used, and any of continuous polymerization and batch polymerization can be used. The polymerization reaction may be carried out in one stage or in more than one stage.

In the case of a multistage polymerization reaction, for example, a two-stage polymerization reaction, generally propylene is polymerized in the presence of the catalyst components (A), (B), and (C) in the first stage to prepare a crystalline polypropylene, and then in the second stage, ethylene and propylene are copolymerized in the presence of the crystalline polypropylene and in the presence of the catalyst components (A), (B) and (C), optionally after the unreacted propylene in the first stage is removed.

In the above reaction, the olefin pressure is from normal pressures to 50 kg/cm² and the reaction temperature is 0° to 200° C., preferably 30° to 100° C.

The reaction time is 5 minutes to 10 hours, preferably 30 minutes to 5 hours.

The modification of the molecular weight in the polymerization can be effected by known means, for example, by means of hydrogen.

As described above, according to the process of the present invention, the polymerization activity of the catalyst is high, and an olefin polymer can be obtained efficiently without allowing this polymerization activity to lower with time, and therefore, the step of removing the catalyst, and the step of washing the polymer can be simplified or can be omitted. Thus the process of the present invention has several advantages, for example, the obtained olefin polymer is high in stereoregularity, and contains less the catalyst remaining therein.

Further, if an alcohol is used to prepare the solid catalyst component (A), it is advantageous because the morphology of the obtained powder becomes favorable (the bulk density becomes high, which is favorable in view of the production).

EXAMPLES

The present invention will now be described in detail with reference to the following Examples.

Example 1

(1) Preparation of a Solid Catalyst Component (A)

60 ml of n-heptane that had been dehydrated, 4.5 g of diethoxymagnesium, and 1.2 ml of di-n-butyl phthalate were charged into a 500-ml four-necked flask, then after the mixture was stirred at room temperature, 1.5 ml of silicon tetrachloride were added thereto, the temperature was elevated and they are reacted for 30 minutes under reflux.

Then, 100 ml of titanium tetrachloride were added thereto, and the reaction was performed at 110° C. for 2 hours. Thereafter, washing with n-heptane was effected, then 100 ml of titanium tetrachloride were added, and after the reaction was effected at 110° C. for 2 hours, washing with n-heptane was effected sufficiently to obtain a solid catalyst component (A). The content of titanium was 25 mg per gram of the catalyst, and di-n-butyl phthalate was contained in an amount of 143 mg per gram of the catalyst.

(2) Preparation of an Olefin Polymer 400 ml of n-heptane were charged into a 1-l stainless steel autoclave, then 1 mmol of triisobutylaluminum that was the component (B), 0.1 mmol of tert-butyl methyl ether and 0.088 mmol of dicyclohexyl phthalate that was the component (C), and the solid catalyst component (A) obtained above in an amount of 0.0025 mmol in terms of the titanium atom were charged, and the polymerization was effected at 70° C. for 2 hours while keeping the hydrogen pressure and the propylene pressure at 0.2 kg/cm², and 7.0 kg/cm² respectively. The yield of the polypropylene was 532 kg per gram of titanium, and the boiling heptane extraction residue (I.I.) was 97.8%.

Example 2

The preparation of an olefin polymer of Example 1-(2) was repeated, with the exception that instead of triisobutylaluminum, triethylaluminum was used, and as the electron donative compound (C), 0.025 mmol of diphenyldimethoxysilane was used. The results were that the yield of the polypropylene was 723 kg per gram of titanium, and I.I. was 98.2%. When the polymerization time was changed to 3 hours, the yield of the polypropylene was 932 kg per gram of titanium, and I.I. was 98.0%.

Example 3

(1) Preparation of a Solid Catalyst Component

The preparation of the solid catalyst component of Example 1-(2) was repeated, with the exception that instead of di-n-butyl phthalate, diisobutyl phthalate was used. The results were that the titanium content per gram of the catalyst was 22 mg, and the isobutyl phthalate content per gram of the catalyst was 128 mg.

(2) Preparation of an Olefin Polymer

Polymerization under the same conditions as those in Example 2 was carried out. The yield of the polypropylene per gram of titanium was 685 kg, and I.I. was 97.9%.

Comparative Example 1

(1) Preparation of a Solid Catalyst Component

The preparation of the solid catalyst component of Example 1-(1) was repeated, with the exception that instead of di-n-butyl phthalate, 1.2 ml of ethyl benzoate were used to prepare a solid catalyst component. The content of titanium per gram of the catalyst was 32 mg, and the content of ethyl benzoate per gram of the catalyst was 140 mg.

(2) Preparation of an Olefin Polymer

The preparation of the olefin polymer of Example 1-(2) was repeated, with the exception that instead of tert-butyl methyl ether that was the component (C), 0.27 mmol of p-methyl toluate was used. The yield of the polypropylene was 212 kg per gram of titanium, and I.I. was 96.5%. When the polymerization time was changed to 3 hours, the yield of the polypropylene per gram of titanium was only 252 kg, and I.I. lowered to 94.8%.

Example 4

By using the solid catalyst component (A) obtained in the same way as that for the preparation of the solid catalyst component (A) in Example 1-(1), a propylene-/ethylene copolymer was prepared as follows.

(2) Preparation of a Propylene/Ethylene Copolymer

After a 5-l autoclave was flushed well with nitrogen gas, 20 g of polypropylene powder that had been dried were charged thereinto. Thereafter, 2.0 mmol of triethylaluminum that was the component (B), 0.1 mmol of triethoxyphenylsilane that was the component (C), and the solid catalyst component (A) in an amount of 0.1 mmol in terms of the titanium atom were charged into the autoclave. Then, hydrogen and propylene were introduced, and the temperature and the pressure were raised to 70° C. and 20 kg/cm$^2$, respectively. The polymerization reaction was effected for 2 hours under these conditions. The intrinsic viscosity [$\eta$] of the obtained propylene monopolymer was 1.2 dl/g.

After the completion of the polymerization, degassing was effected, and then a mixed gas of ethylene and propylene and hydrogen were introduced, and a second polymerization reaction was effected at 55° C. for 2 hours while keeping the pressure at 18 kg/cm$^2$ as the mixed gas pressure. The intrinsic viscosity [$\eta$] of the obtained propylene/ethylene copolymer was 4.0 dl/g, the ethylene content was 40 wt. %, and the production was 16 wt. %.

After the completion of the polymerization, the unreacted gases were removed to obtain the propylene polymer composition.

Prescribed additives were added to the obtained propylene polymer composition, they are mixed, and are formed into granules by an extruder, then test pieces were formed from the granules, and the physical properties thereof were assessed. The bending modulus was 17,000 kg/cm$^2$, and the Izod impact strength was 3.0 kg.cm/cm (−20° C., notched).

Example 5

(1) Preparation of a Solid Catalyst Component (A)

75 ml of n-heptane that had been dehydrated, 3.7 g of diethoxymagnesium, and 1.2 ml of silicon tetrachloride were charged into a 500-ml four-necked flask, then a solution of 1.0 ml of isopropanol and 5 ml of n-heptane was added dropwise thereto at room temperature, the temperature was raised, and the mixture was stirred for 1 hour under reflux. Then, 1.0 ml of di-n-butyl phthalate and then 90 ml of titanium tetrachloride were added, and the reaction was effected at 110° C. for 2 hours. Then after washing with n-heptane, 90 ml of titanium tetrachloride were added, the reaction was effected at 110° C. for 2 hours, and washing with n-heptane was effected to obtain a solid catalyst component (A). The content of titanium per gram of the catalyst was 22 mg, and the solid catalyst component (A) contained di-n-butyl phthalate in an amount of 150 mg per gram of the catalyst.

(2) Preparation of an Olefin Polymer 400 ml of n-heptane were charged into a 1-l stainless steel autoclave, then 1 mmol of triisobutylaluminum, 0.1 mmol of tertbutyl methyl ether, 0.088 mmol of dicyclohexyl phthalate, and the above solid catalyst component in an amount of 0.0025 mmol in terms of the titanium atom were charged thereinto, and the polymerization was effected at 70° C. for 2 hours while keeping the hydrogen pressure and the propylene pressure at 0.2 kg/cm$^2$ and 7.0 kg/cm$^2$ respectively. The yield of the polypropylene was 582 kg per gram of titanium, and the boiling heptane extraction residue (I.I.) was 97.2%. When the polymerization time was changed to 3 hours, the yield of the polypropylene was 718 kg per gram of titanium, and I.I. was 97.1%.

Example 6

The preparation of the olefin polymer of Example 5-(2) was repeated, with the exception that instead of triisobutylalminum, triethylaluminum was used and 0.025 mmol of diphenyldimethoxysilane was used as electron donative compound. The results were that the yield of the polypropylene was 785 kg per gram of titanium, and I.I. was 98.0%.

Example 7

(1) Preparation of a Solid Catalyst Component

Preparation of the solid catalyst component of Example 5-(1) was repeated, with the exception that instead of di-n-butyl phthalate, diisobutyl phthalate was used. The content of titanium per gram of the catalyst was 22 mg, and the content of diisobutyl phthalate per gram of the catalyst was 128 mg.

(2) Preparation of an Olefin Polymer

Polymerization was carried out under the same conditions as in Example 6. The yield of the polypropylene was 685 kg per gram of titanium, and I.I. was 97.9%.

Comparative Example 2

(1) Preparation of a Solid Catalyst Component

The preparation of the solid catalyst component of Example 5-(1) was repeated, with the exception that, instead of dibutyl phthalate, 1.0 ml of ethyl benzoate was used. The content of titanium per gram of the catalyst was 32 mg, and the content of ethyl benzoate per gram of the catalyst was 140 mg.

(2) Preparation of an Olefin Polymer

The preparation of the olefin polymer of Example 5-(2) was repeated, with the exception that, instead of tert-butyl methyl ether and dicyclohexyl phthalate, 0.27 mmol of p-methyl toluate was used. After the polymerization was carried out for two hours, the yield of the polypropylene was 242 kg per gram of titanium, and I.I.

was 96.9%. When the polymerization time was changed to 3 hours, the yield of the polypropylene per gram of titanium was 293 kg, and I.I. was 95.0%.

Example 8

By using the solid catalyst component obtained in the same way as that for the preparation of the solid catalyst component in Example 5-(1), a propylene/ethylene copolymer was prepared.

(2) Preparation of a Propylene/Ethylene Copolymer

A 5-l autoclave was flushed well with nitrogen gas, and 20 g of polypropylene powder that had been dried were charged thereinto. Thereafter, 2.0 mmol of triethylaluminum, 0.1 mmol of diphenyldimethoxysilane, and the solid catalyst component in an amount of 0.1 mmol in terms of the Ti atom were charged into the autoclave. Then hydrogen and propylene were introduced, and the pressure and the temperature were raised to 70° C. and 20 kg/cm² respectively. The polymerization reaction was effected under these conditions for 2 hours. The $[\eta]$ of the obtained propylene monopolymer was 1.3 dl/g.

After the completion of the polymerization, degassing was effected, and then a mixed gas of ethylene and propylene, and hydrogen were introduced, and a second polymerization reaction was effected at 55° C. for 2 hours while keeping the pressure at 18 kg/cm² in terms of the mixed gas pressure. The $[\eta]$ of the obtained propylene/ethylene copolymer was 4.0 dl/g, the ethylene content was 37 wt. %, and the production was 15 wt. %.

After the completion of the polymerization, the unreacted gases were removed to obtain the propylene polymer composition. Prescribed additives were added to the obtained propylene polymer composition, they are mixed, and are formed into granules by an extruder, then test pieces were formed from the granules, and the physical properties thereof were assessed. The bending modulus was 16,700 kg/cm², and the Izod impact strength was 3.2 kg.cm/cm (−20° C., notched).

Example 9

(1) Preparation of a Solid Catalyst Component

The preparation of the solid catalyst component of Example 1-(1) was repeated, with the exception that, instead of di-n-butyl phthalate, 0.7 ml of diethyl phthalate was used.

The titanium content per gram of the catalyst was 23 mg, and the catalyst contained 102 mg of diethyl phthalate.

(2) Preparation of an Olefin Polymer

Polymerization was effected under the same conditions as those in Example 2. The yield of the polypropylene was 689 kg per gram of titanium, and I.I. was 98.0%.

Example 10

(1) Preparation of a Solid Catalyst Component

The preparation of the solid catalyst component of Example 5-(1) was repeated, with the exception that, instead of di-n-butyl phthalate, 0.58 ml of diethyl phthalate was used. The titanium content per gram of the catalyst was 25 mg, and the catalyst contained 98 mg of diethyl phthalate.

(2) Preparation of an Olefin Polymer

Polymerization was effected under the same conditions as those in Example 2. The yield of the polypropylene was 720 kg per gram of titanium, and I.I. was 97.6%.

Example 11

After a 5-l autoclave was flushed well with nitrogen gas, 50 g of polybutene-1 powder that had been dried were charged into the autoclave. Thereafter, 2.0 mmol of triisobutylaluminum, 0.5 mmol of triethoxyphenylsilane, and the solid catalyst prepared in Example 9 in an amount of 0.1 mmol in terms of the titanium atom were charged. Then, hydrogen, nitrogen, and butene-1 were introduced, and the temperature and the pressure were raised to 55° C., and 7 kg/cm² respectively. The polymerization was carried out under these conditions for 3 hours. A polybutene-1 having an intrinsic viscosity $[\eta]$ of 2.5 dl/g was obtained in an amount of 250 kg/g of Ti. The mm-ratio by $C^{13}$ NMR analysis was 95.8%.

What is claimed is:

1. A process of producing an olefin polymer having stereoregularity by polymerizing olefin monomers in the presence of a catalyst, said catalyst comprising:

(A) a solid catalyst component,
   (B) a tri-$C_1$-$C_5$-alkylaluminum, and
   (C) an electron donative compound;

wherein said solid catalyst component (A) is obtained by reacting, in a first step, (i) a dialkoxymagnesium compound of the formula $Mg(OR^1)_2$ wherein $R^1$ is an alkyl group having 1 to 4 carbon atoms with (ii) a phthalate diester in an amount of from 0.01 to 1 moles of said diester per mole of said dialkoxymagnesium compound and (iii) tetrachlorosilane in an amount of 0.01 to 5 moles per mole of a said dialkoxymagnesium compound, to form a solid reaction product; and then reacting, in a second step, the solid reaction product with titanium tetrachloride.

2. A process of producing an olefin polymer as claimed in claim 1, wherein the monomers are represented by the general formula: $R^3$—CH=CH$_2$ wherein $R^3$ is selected from the group consisting of a hydrogen atom, and an alkyl group having 1 to 6 carbon atoms.

3. A process of producing an olefin polymer as claimed in claim 1, wherein the olefin monomers are selected from the group consisting of ethylene, propylene and mixtures thereof.

4. A process of producing an olefin polymer as claimed in claim 1, wherein the phthalate diester is dibutyl phthalate.

5. A process of producing an olefin polymer having stereoregularity by polymerizing olefin monomers in the presence of a catalyst, said catalyst comprising:

(A) a solid catalyst component,
   (B) a tri-$C_1$-$C_5$-alkylaluminum, and
   (C) an electron donative compound;

wherein said solid catalyst component (A) is obtained by reacting, in a first step, (i) a dialkoxymagnesium compound of the formula $Mg(OR^1)_2$ wherein $R^1$ is an alkyl group having 1 to 4 carbon atoms with (ii) a phthalate diester in an amount of from 0.01 to 1 moles per mole of said dialkoxymagnesium compound, (iii) tetrachlorosilane in an amount of 0.01 to 5 moles per mole of said dialkoxymagnesium compound and (iv) an alcohol of the formula $R^4OH$, wherein $R^4$ is selected from the group consisting of a linear or branched alkyl group having 1 to 10 carbon atoms and a cycloalkyl group, said alcohol being in an amount of 0.01 to 2 moles per mole of said dialkoxymagnesium compound, to form a solid reaction product; and then reacting, in a second step, the solid reaction product with a titanium tetrachloride compound.

6. A process of producing an olefin polymer as claimed in claim 5, wherein the olefin monomers are represented by the general formula: $R^3-CH=CH_2$ wherein $R^3$ is selected from the group consisting of a hydrogen atom, and an alkyl group having 1 to 6 carbon atoms.

7. A process of producing an olefin polymer as claimed in claim 5, wherein the olefin monomers are selected from the group consisting of ethylene, propylene and mixtures thereof.

8. A process of producing an olefin polymer as claimed in claim 5, wherein the phthalate diester is dibutyl phthalate.

* * * * *